Dec. 10, 1929.  A. C. PARKER  1,739,371
CHUCK
Filed Feb. 21, 1925   2 Sheets-Sheet 1
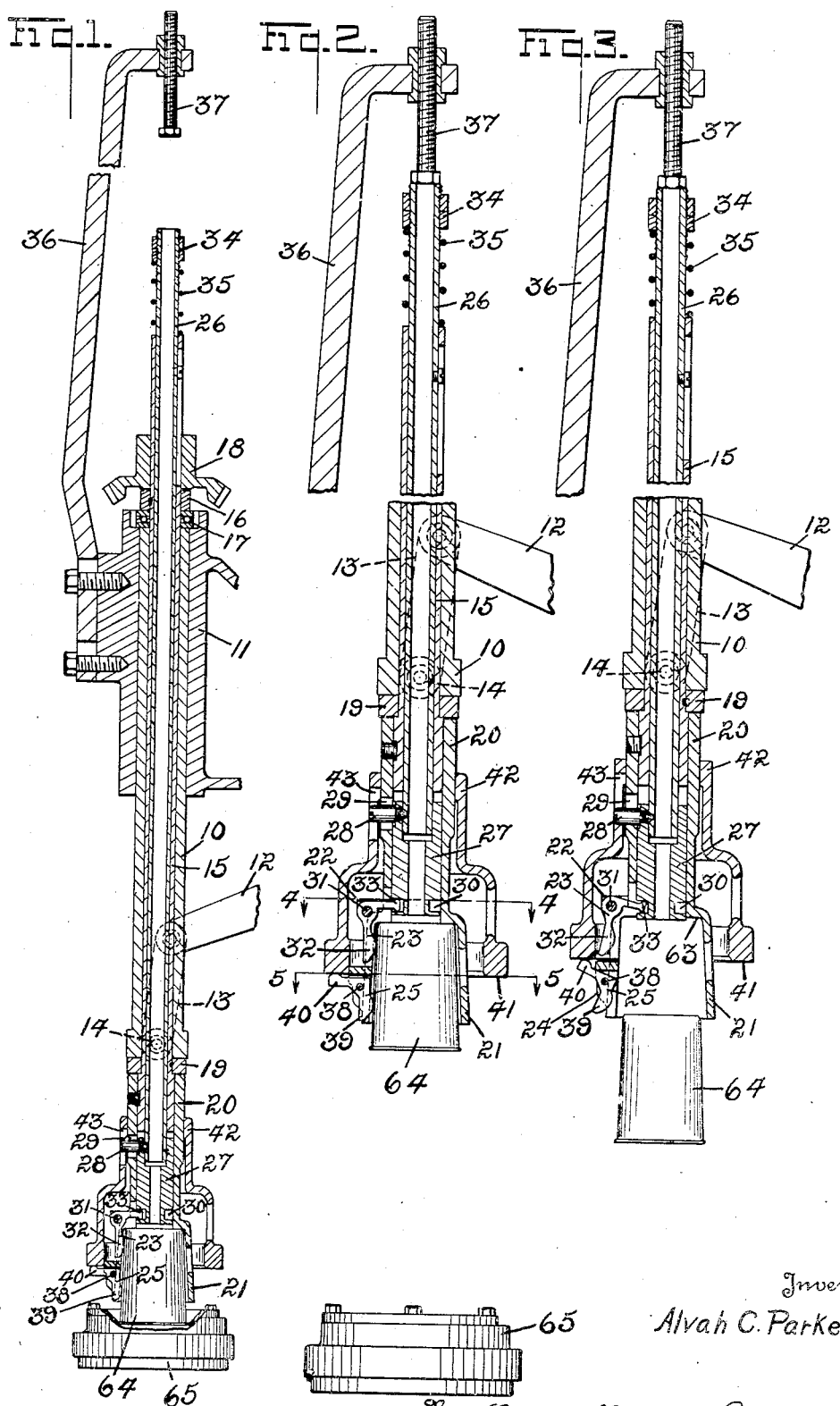
Inventor
Alvah C. Parker
By Owen, Owen & Crampton
Attorneys Dec. 10, 1929.  A. C. PARKER  1,739,371
CHUCK
Filed Feb. 21, 1925  2 Sheets-Sheet 2

Inventor
Alvah C. Parker.

By Owen, Owen & Crampton
Attorneys.

Patented Dec. 10, 1929

1,739,371

UNITED STATES PATENT OFFICE

ALVAH C. PARKER, OF TOLEDO, OHIO, ASSIGNOR TO THE LIBBEY GLASS MANUFACTURING COMPANY, A CORPORATION OF OHIO

CHUCK

Application filed February 21, 1925. Serial No. 10,728.

My invention relates to chucks and particularly chucks adapted for holding glass articles during the burning-off process.

The object of my invention is to provide a chuck for the purpose described wherein the article may be easily placed, which will accurately center an article placed therein, and from which an article can be removed readily. Details of the invention will appear as the description proceeds.

Figure 6:
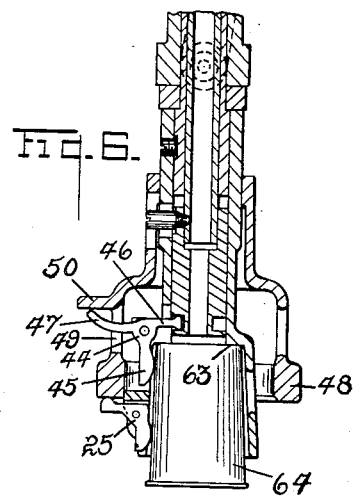
Figure 7:
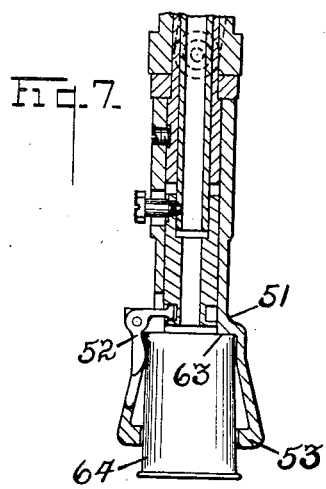
Figure 8:
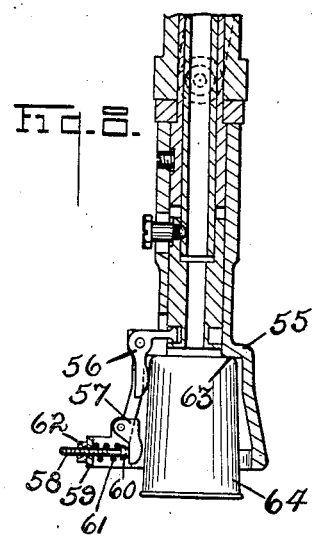
Figure 4:
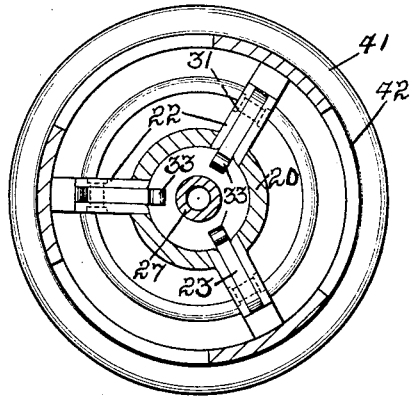
Figure 5:
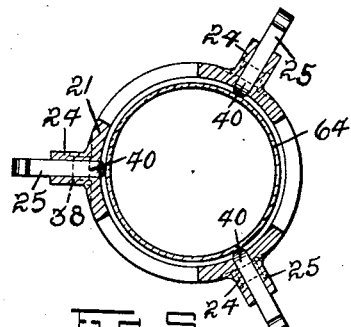

Figure 1 is a longitudinal section of my improved chuck and supporting and operating devices therefor; Figs. 2 and 3 are sections similar to Fig. 1 with parts omitted and showing the parts in different relative positions; Fig. 4 is a section on the line 4—4 of Fig. 2; Fig. 5 is a section on the line 5—5 of Fig. 2; Figs. 6, 7 and 8 are sections of modified forms of chuck heads.

The improved chuck and operating means therefor comprises a sleeve 10 vertically reciprocable within a bearing member 11, suitably supported upon any framework (not shown). A lever 12 operable by any suitable mechanism (not shown) is connected by a link 13 to pivots 14 on sleeve 10 and serves to reciprocate the sleeve within its bearing. Within the sleeve there is a spindle 15. A collar 16 attached to the spindle rests upon a ball bearing 17 mounted on the upper end of sleeve 10. A gear 18 is feathered upon the spindle above collar 16 and is driven by any suitable means (not shown) in order to turn the spindle. Beneath sleeve 10 there is a collar 19 fixed upon the spindle and preventing its longitudinal movement relative to the sleeve.

Carried by the lower end of the spindle there is a chuck sleeve 20 carrying a chuck head 21. Ears 22 project from near the upper portion of the chuck head and have pivoted thereto substantially L-shaped gripping members 23. Near the lower end of the head there are another series of ears 24 to which are pivoted substantially L-shaped gripping members 25.

An operating rod 26 slides within spindle 15 and has attached to its lower end a gripper-operating head 27. Head 27 is attached to rod 26 by means of a set screw 28 which extends through a slot 29 in chuck sleeve 20. The lower end of operating head 27 is provided with an annular groove 30. Upper gripping members 23 are pivoted to ears 22 by pivots 31 and each is provided with a downwardly extending gripping arm 32 and a substantially horizontal operating arm 33. Operating arms 33 enter groove 30 in operating head 27. A collar 34 is adjustably secured to the upper end of rod 26, and rod 26 is normally elevated with respect to the spindle by a spring 35, which is compressed between the upper end of the spindle and collar 34. A bracket arm 36 is adjustably secured to bearing member 11 and carries a screw 37 in line with rod 26.

Lower gripping members 25 are pivoted to ears 24 by pivots 38 and each of the members 25 has a downwardly extending gripping arm 39 and an outwardly extending operating arm 40. A holding ring 41 is suspended from the lower end of a hub 42 surrounding chuck sleeve 20. Ring 41 is adapted to rest upon operating arms 40 during the normal operation of the chuck. Hub 42 is provided with a slot 43 through which the head of set screw 28 projects.

The operation of the chuck thus far described is substantially as follows:

When the parts are in the position shown in Fig. 3, spindle 15 is raised so that rod 26 abuts screw 37 and spring 35 is compressed, whereby the spindle is raised relative to the rod. This results in raising pivots 31 relatively to groove 30, whereby ends 32 of gripping members 23 are swung outward to release any article held thereby.

In the form shown in Figs. 1 to 3, operating ring 41 and its hub 42 are designed to be operated by hand, and the chuck operator raises this operating ring and hub by any suitable means so as to release gripping members 25 and release any article held by the chuck. When the chuck operator desires to place a new article in the chuck, ring 41 is again raised, the article is placed in the chuck and then ring 41 is lowered so that the article is held by gripping members 25. Thereafter lever 12 is operated to lower the spindle, whereupon rod 26 is forced upward relative to spindle 15, thereby raising the inner ends of arms 33 and causing gripping arms 32 to contact the upper end of the article, thereby securely holding the article in centered position within the chuck.

After the article in the chuck has been suitably operated upon, lever 12 is raised once more until contact of rod 26 with screw 37 releases the upper gripping members, whereupon the chuck operator may release the lower gripping members, remove the article in the chuck and replace it with a new article in the manner previously described.

In the form shown in Fig. 6, an alternative form 44 of upper gripping member is disclosed. This form of gripping member has a downwardly extending gripping end 45, an inwardly extending operating end 46, and an outwardly extending operating arm 47. Arms 45 and 46 operate in exactly the same way as arms 32 and 33 during the operation of the chuck. A modified form of holding ring 48 is shown in Fig. 6. This modified form of holding ring is provided with slots 49 through which arms 47 of the upper gripping members project. Outwardly extending lugs 50 above slots 49 are in position above the outer ends of arms 47. It will be readily seen that, when a chuck constructed as shown in Fig. 6 is raised to the position shown in Fig. 3 so that arms 46 are swung downward, the resultant upward motion of arms 47 will raise ring 48 and so release the lower gripping members, which are constructed in exactly the same way as those shown in Figs. 1 to 3.

Another from of chuck is shown in Fig. 7, in which a modified form of chuck head 51 is provided with upper clamping members 52 similar to gripping members 23, and has a fixed lower ring or flange 53 in place of the lower gripping members. Ring or flange 53 is designed to be a trifle larger than the article, as clearly shown in Fig. 7, so that during the normal operation of the chuck the article does not contact ring 53, that ring acting merely as a guide to assist in properly placing the article within the chuck and to prevent excessive lateral movement of the lower end of the article.

In Fig. 8 another modified form of chuck is disclosed. In this form, chuck head 55 is provided with upper gripping members 56 similar in all respects to gripping members 23 disclosed in Figs. 1 to 3. The lower end of chuck head 55 is provided with guiding members 57. A pin 58, slidable through a lug 59 on chuck head 55, has an inner end 60 adapted to contact the guiding end of guiding member 57. A spring 61, between lug 59 and head 60, normally presses the head against the guiding member and holds the member in the position shown in Fig. 8. A nut 62 on the outer end of pin 58 limits the inward movement of the pin.

In the preferred arrangement shown in Fig. 8, guiding member 57 is normally out of contact with the article so as to act as a guide similar to guide ring 53 in the form shown in Fig. 7. The advantage of the form shown in Fig. 8 is that guide members 57 are yieldable where necessary, manipulation of nut 62 enables the use of the chuck for articles of varying shapes, and the same structure may be used, if desired, with nut 62 so adjusted that members 57 are held in gripping contact with the lower end of the article, instead of acting as guides only.

Each chuck is provided with a shoulder 63 against which the bottom of such an article as tumbler 64 is adapted to rest. When the chuck is raised to the extreme upper position, shown in Fig. 3, shoulder 63 is raised above the lower end of operating head 27. This loosens the article in the chuck if necessary.

The chuck should be lowered, before another article is placed therein, at least enough so that operating head 27 does not interfere with placing the bottom of the article against shoulder 63, and, if desired, the chuck may be lowered to such an extent that when the article is forced into place, it spreads the grippers and is at once held thereby.

In Figs. 1 and 2 an annular burner 65 is shown diagrammatically. The chuck is primarily designed for inserting tumblers within an annular burner for burning-off the moil thereon, or for other analogous purposes. It is obvious that the chuck may be readily modified to receive articles of different shapes and may be used for various purposes other than that mentioned, so that my invention is not confined to the exact form of mechanism disclosed nor to the particular use of that mechanism herein mentioned.

What I claim is:

1. In chuck mechanism, a reciprocable sleeve, a spindle rotatable within and reciprocable with the sleeve, a chuck on one end of the spindle, a rod reciprocable within and rotatable with the spindle, operative connections between the rod and chuck, and a stop in position to encounter said rod when the sleeve is reciprocated.

2. Apparatus in accordance with claim 1, comprising a spring pressing the rod towards one limit of its reciprocation within the spindle, encounter with the stop being adapted to compress said spring.

3. Apparatus in accordance with claim 1, comprising a spring pressing the rod towards chuck-closing position and adapted to be compressed when the rod encounters the stop, and the spring being at the opposite end of the spindle from the chuck.

4. In chuck mechanism, a chuck rotatable about a vertical axis, said chuck having means against which one end of an article may be positioned and in addition comprising two series of gripping members at different levels, automatic means for opening and closing the upper series of gripping members, and manually operable means for opening and closing the lower series of gripping members.

5. In chuck mechanism, a chuck rotatable about a vertical axis, said chuck having means against which one end of an article may be positioned and in addition comprising two series of gripping and centering members at different levels, spring actuated means for closing one series of grippers and a weight for closing the other series of grippers.

6. Mechanism in accordance with claim 5, in which the upper series of grippers is actuated by the spring means.

7. Mechanism in accordance with claim 5, wherein the weight operates to close the lower series of grippers.

8. In chuck mechanism, a chuck head having a shoulder adapted to contact the end of an article supported in the chuck, a series of L-shaped grippers pivoted at their angles and each having one arm parallel with the the axis of the chuck and the other arm projecting in towards said axis, and a member operatively connected to the inturned arms of the grippers and movable axially of the chuck to reciprocate its end past said shoulder.

In testimony whereof, I have hereunto signed my name to this specification.

ALVAH C. PARKER.